United States Patent
Urmanov et al.

(10) Patent No.: US 7,478,075 B2
(45) Date of Patent: Jan. 13, 2009

(54) REDUCING THE SIZE OF A TRAINING SET FOR CLASSIFICATION

(75) Inventors: Aleksey M. Urmanov, San Diego, CA (US); Anton A. Bougaev, Lafayette, IN (US); Kenny C. Gross, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 309 days.

(21) Appl. No.: 11/403,134

(22) Filed: Apr. 11, 2006

(65) Prior Publication Data
US 2007/0260566 A1    Nov. 8, 2007

(51) Int. Cl.
G06F 15/18 (2006.01)
G06N 3/08 (2006.01)

(52) U.S. Cl. ...................................... 706/25
(58) Field of Classification Search ........................ None
See application file for complete search history.

(56) References Cited

U.S. PATENT DOCUMENTS

| | | | |
|---|---|---|---|
| 6,233,575 B1 * | 5/2001 | Agrawal et al. | 707/6 |
| 6,269,353 B1 * | 7/2001 | Sethi et al. | 706/20 |
| 6,324,532 B1 * | 11/2001 | Spence et al. | 706/27 |
| 6,389,436 B1 * | 5/2002 | Chakrabarti et al. | 715/229 |
| 6,400,996 B1 * | 6/2002 | Hoffberg et al. | 700/83 |
| 6,463,438 B1 * | 10/2002 | Veltri et al. | 706/15 |
| 6,526,168 B1 * | 2/2003 | Ornes et al. | 382/158 |
| 6,640,145 B2 * | 10/2003 | Hoffberg et al. | 700/83 |
| 6,708,146 B1 * | 3/2004 | Sewall et al. | 704/217 |
| 6,728,690 B1 * | 4/2004 | Meek et al. | 706/25 |
| 6,829,384 B2 * | 12/2004 | Schneiderman et al. | 382/154 |
| 6,850,252 B1 * | 2/2005 | Hoffberg | 715/716 |
| 6,941,318 B1 * | 9/2005 | Tamayo et al. | 707/102 |
| 6,950,813 B2 * | 9/2005 | Srinivasa et al. | 706/52 |
| 7,006,881 B1 * | 2/2006 | Hoffberg et al. | 700/83 |
| 7,034,670 B2 * | 4/2006 | Kennedy et al. | 340/438 |
| 7,096,206 B2 * | 8/2006 | Hitt | 706/12 |
| 7,117,188 B2 * | 10/2006 | Guyon et al. | 706/20 |
| 7,139,764 B2 * | 11/2006 | Lee | 707/100 |
| 7,142,693 B2 * | 11/2006 | Zhang et al. | 382/100 |

(Continued)

OTHER PUBLICATIONS

Lazy Bagging for Classifying Imbalanced Data Xingquan Zhu; Data Mining, 2007. ICDM 2007. Seventh IEEE International Conference on Oct. 28-31, 2007 pp. 763-768 Digital Object Identifier 10.1109/ICDM.2007.95.*

(Continued)

Primary Examiner—Michael B Holmes
(74) Attorney, Agent, or Firm—Park, Vaughan & Fleming LLP (57) ABSTRACT

A system that reduces the size of a design data set. During this design data set reduction operation, the system computes a decision boundary which separates a first group of data patterns in a training data set from a second group of data patterns in the training data set. For each data pattern in the training data set, the system determines if removing the data pattern from the training data set substantially affects the resulting decision boundary. If so, the system marks the data pattern as a key pattern. The system then removes all data patterns that are not marked as key patterns to produce a reduced training data set which represents the decision boundary.

19 Claims, 7 Drawing Sheets

U.S. PATENT DOCUMENTS

| | | | | |
|---|---|---|---|---|
| 7,225,343 | B1* | 5/2007 | Honig et al. | 713/194 |
| 7,227,893 | B1* | 6/2007 | Srinivasa et al. | 375/240.08 |
| 7,240,038 | B2* | 7/2007 | Hitt | 706/12 |
| 7,293,000 | B2* | 11/2007 | Lee | 706/12 |
| 7,318,051 | B2* | 1/2008 | Weston et al. | 706/12 |
| 7,369,696 | B2* | 5/2008 | Arini et al. | 382/133 |

OTHER PUBLICATIONS

Refine decision boundaries of a statistical ensemble by active learning Dingsheng Luo; Ke Chen; Neural Networks, 2003. Proceedings of the International Joint Conference on vol. 2, Jul. 20-24, 2003 pp. 1523-1528 vol. 2 Digital Object Identifier 10.1109/IJCNN.2003. 1223924.*

Genetic algorithms for generation of class boundaries Pal, S.K.; Bandyopadhyay, S.; Murthy, C.A.; Systems, Man, and Cybernetics, Part B, IEEE Transactions on vol. 28, Issue 6, Dec. 1998 pp. 816-828 Digital Object Identifier 10.1109/3477.735391.*

A new algorithm for Kohonen layer learning with application to power system stability analysis Young Moon Park; Gwang-Won Kim; Hong-Shik Cho; Lee, K.Y.; Systems, Man, and Cybernetics, Part B, IEEE Transactions on vol. 27, Issue 6, Dec. 1997 pp. 1030-1034 Digital Object Identifier 10.1109/3477.650064.*

Nearest Neighbor Classification of Remote Sensing Images With the Maximal Margin Principle Blanzieri, E.; Melgani, F.; Geoscience and Remote Sensing, IEEE Transactions on vol. 46, Issue 6, Jun. 2008 pp. 1804-1811 Digital Object Identifier 10.1109/TGRS.2008. 916.*

Efficient Training Data Reduction for SVM based Handwritten Digits Recognition Javed, I.; Ayyaz, M.N.; Mehmood, W.; Electrical Engineering, 2007. ICEE '07. International Conference on Apr. 11-12, 2007 pp. 1-4 Digital Object Identifier 10.1109/ICEE.2007. 4287360.*

Source based feature extraction for support vector machines in hyperspectral classification Halldorsson, G.H.; Benediktsson, J.A.; Sveinsson, J.R.; Geoscience and Remote Sensing Symposium 2004. IGARSS '04. Proceedings. 2004 IEEE International vol. 1, Sep. 20-24, 2004 Page(s): Digital Object Identifier 10.1109/IGARSS. 2004.1369082.*

Computerized radiographic mass detection. II. Decision support by featured database visualization and modular neural networks Li, H.; Wang, Y.; Liu, K.J.R.; Lo, S.-C.B.; Freedman, M.T.; Medical Imaging, IEEE Transactions on vol. 20, Issue 4, Apr. 2001 pp. 302-313 Digital Object Identifier 10.1109/42.921479.*

Data mapping by probabilistic modular networks and information-theoretic criteria Yue Wang; Shang-Hung Lin; Huai Li; Sun-Yuan Kung; Signal Processing, IEEE Transactions on [see also Acoustics, Speech, and Signal Processing, IEEE Transactions on] vol. 46, Issue 12, Dec. 1998 pp. 3378-3397 Digital Object Identifier 10.1109/78. 735311.*

On Classification Confidence and Ranking Using Decision Trees Toth, N.; Pataki, B.; Intelligent Engineering Systems, 2007. INES 2007. 11th International Conference on Jun. 29, 2007-Jul. 2, 2007 pp. 133-138 Digital Object Identifier 10.1109/INES.2007.4283686.*

Two-Dimensional Concept Vector Machines Based on an Ionic Interaction Model Hyunsoo Kim; Haesun Park; Neural Networks and Brain, 2005. ICNN&B '05. International Conference on vol. 3, Oct. 13-15, 2005 pp. 1991-1995 Digital Object Identifier 10.1109/ ICNNB.2005.1615014.*

Learning vector quantization without and with habituation Geszti, T.; Csabai, I.; Neural Networks, 1992. IJCNN., International Joint Conference on vol. 2, Jun. 7-11, 1992 pp. 935-940 vol. 2 Digital Object Identifier 10.1109/IJCNN.1992.226867.*

Pattern classification using relative constraints Carlotto, M.J.; Computer Vision and Pattern Recognition, 1988. Proceedings CVPR '88., Computer Society Conference on Jun. 5-9, 1988 pp. 450-456 Digital Object Identifier 10.1109/CVPR.1988.196274.*

The Nearest Neighbor Algorithmn of Local Probability Centers Boyu Li; Yun Wen Chen; Yan Qiu Chen; Systems, Man, and Cybernetics, Part B, IEEE Transactions on vol. 38, Issue 1, Feb. 2008 pp. 141-154 Digital Object Identifier 10.1109/TSMCB.2007.908363.*

Time-varying feature selection and classification of unvoiced stop consonants Nathan, K.S.; Silverman, H.F.; Speech and Audio Processing, IEEE Transactions on vol. 2, Issue 3, Jul. 1994 pp. 395-405 Digital Object Identifier 10.1109/89.294353.*

Nonlinear decision boundaries for testing analog circuits Stratigopoulos, H.-G.D.; Makris, Y.; Computer-Aided Design of Integrated Circuits and Systems, IEEE Transactions on vol. 24, Issue 11, Nov. 2005 pp. 1760-1773 Digital Object Identifier 10.1109/TCAD.2005. 855835.*

* cited by examiner

REDUCING THE SIZE OF A TRAINING SET FOR CLASSIFICATION

RELATED APPLICATION

This application is related to a pending U.S. patent application, entitled "Method and Apparatus for Classifying Data Using R-Functions," by inventors Anton A. Bougaev and Aleksey M. Urmanov, having Ser. No. 11/387,253 and a filing date of 22 Mar. 2006.

BACKGROUND

1. Field of the Invention

The present invention relates to techniques for automatically classifying data. More specifically, the present invention relates to a method and apparatus that reduces the size of a training set for a classification application without substantially affecting the resultant decision boundary.

2. Related Art

Automated systems for classification-type pattern recognition applications, such as system fault identification and computer network intrusion (or denial of service attack) detection, operate by dividing input data into more readily processable subsets. More specifically, such data processing techniques typically employ classification-type pattern recognition mechanisms to divide the available data into two (and sometimes multiple) subsets.

Unfortunately, the computational time required to classify input data using pattern recognition techniques, such as k-Nearest Neighbor (kNN) classifiers, Radial Basis Function (RBF) networks, Least-Squares Support Vector Machines (LSSVM), Multivariate State Estimation Techniques (MSET), and other techniques, increases linearly (or quadratically for some techniques) with the number of training patterns. This computational cost limits the applicability of classification-type pattern recognition for online diagnostics and for offline mining of large (from 10,000 patterns and up) databases.

One technique for reducing the computational time required for input data classification is to reduce the size of the training set. However, training patterns cannot be arbitrarily eliminated. In particular, if the training patterns are not pruned judiciously, bias and inconsistency are introduced in subsequent classification analyses.

The "condensed nearest neighbor" rule is used by some systems to reduce the size of a training set. For example, a system can start with a one-pattern reduced set and sequentially examine the other patterns in the training set, discarding patterns that are correctly classified by the current reduced set and adding patterns that are classified incorrectly to the reduced set. The system then iterates through the discarded patterns until all of the remaining discarded patterns are classified correctly by the reduced training set. Unfortunately, this technique is not "decision-boundary consistent" and does not always find a minimal training set.

One decision-boundary-consistent technique, called the "Voronoi-editing technique," uses Voronoi diagrams. A Voronoi diagram partitions the input space into regions that are the loci of points in space closer to each data point than to any other data point. The Voronoi-editing technique maintains exactly the original decision boundary of the nearest neighbor decision rule; however, the reduced set produced by the technique is not minimal. Furthermore, this technique requires $O(n^{d/2})$ operations, which makes it impractical for dimensions higher than four.

An improvement over the Voronoi-editing technique is the "Gabriel-graph-condensing technique," which constructs the Gabriel graph (a set of edges joining pairs of points that form the diameter of an empty sphere) of the training set. This technique is significantly faster and only requires $O(dn^3)$ operations. However, the Gabriel-graph-condensing technique does not preserve the decision boundary.

Another iterative training set reduction technique applies a deletion rule that identifies patterns to be removed, removes the identified patterns, and applies the rule again to the reduced set until no more patterns can be removed. More specifically, the deletion rule can be stated as follow: for each point x, if the number of other points that classify x correctly is greater than the number of points classified by x, then discard point x. Unfortunately, this technique does not preserve the decision boundary and may require excessively long execution times due to its iterative nature.

The above techniques and other ad-hoc techniques suffer from one of the following deficiencies: (1) prohibitively long running time (third order and higher order polynomial in the number and in the dimension of training patterns); (2) inconsistency of the resultant decision boundary obtained on the reduced set (i.e. the decision boundary is different than would have been obtained with the complete set of training patterns); and (3) suboptimal size for the reduced training set (i.e. there exists a smaller subset that results in the same decision boundary as obtained with the complete set of training patterns).

Hence, what is needed is a method and an apparatus for reducing the size of a training set without the above-described problems.

SUMMARY

One embodiment of the present invention provides a system that reduces the size of a design data set. During this design data set reduction operation, the system computes a decision boundary which separates a first group of data patterns in a training data set from a second group of data patterns in the training data set. For each data pattern in the training data set, the system determines if removing the data pattern from the training data set substantially affects the resulting decision boundary. If so, the system marks the data pattern as a key pattern. The system then removes all data patterns that are not marked as key patterns to produce a reduced training data set which represents the decision boundary.

In a variation on this embodiment, while determining if removing the data pattern substantially affects the decision boundary, the system: (1) computes a first Euclidian distance from the data pattern to the decision boundary; (2) removes the data pattern from the training data set; (3) computes a new decision boundary from the data set without the data pattern; and (4) computes a second Euclidian distance from the data pattern to the new decision boundary. If the absolute value of the difference between the second Euclidian distance and the first Euclidian distance is greater than a pre-specified tolerance, the system marks the data pattern as a key pattern.

In a further variation, the pre-specified tolerance is zero, so that if the second Euclidian distance is not equal to the first Euclidian distance, the data pattern is marked as a key pattern.

In a variation on this embodiment, while computing the new decision boundary, for each data pattern in the first group of data patterns, the system: (1) selects a data pattern from the first group of data patterns; (2) for each data pattern in the second group of data patterns, generates a separating boundary that separates the data pattern in the first group of data patterns from the data pattern in the second group of data patterns; and (3) generates a separating bundle which separates the data pattern in the first group of data patterns from all data patterns in the second group of data patterns. The system then generates the new decision boundary which separates all data patterns in the first group of data patterns from all data patterns in the second group of data patterns using the separating bundles.

In a variation on this embodiment, the system uses the reduced data set to classify a previously unseen pattern. In doing so, the system determines the region of the input space in which the previously unseen pattern is located. If the previously unseen pattern is located within the region which corresponds to the first group of data patterns, the system classifies the previously unseen data pattern as belonging to the first group of data patterns. Otherwise, the system classifies the previously unseen data pattern as belonging to the second group of data patterns.

In a variation on this embodiment, the system uses R-functions to compute a decision boundary which is used to classify data patterns. Note that an R-function is a function whose sign is determined by the signs of its arguments.

BRIEF DESCRIPTION OF THE FIGURES

Table 1 presents a list of separating primitives in accordance with an embodiment of the present invention.

Table 2 presents a list of R-cloud classifier decision making options in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Overview

One embodiment of the present invention provides a technique for reducing the amount of computation required for two-group pattern classification of input data. This input data can include data received by automated systems for various applications, such as for hardware and software fault detection and isolation (FDI) computer systems, or for data generated by life-sciences studies (i.e. drug trials, etc.).

In one embodiment of the present invention, a "key-pattern-extraction" (KPE) technique reduces the computation time required for two-group pattern classification of input data by reducing the size of a training data set without substantially affecting the decision boundary. In one embodiment of the present invention, the key-pattern-extraction technique: (1) takes advantage of the R-function based representation (defined below) of a decision boundary; which permits the evaluation of the shortest distance from any point to the decision boundary; (2) requires $O(dn^3)$ operations, which is significantly faster than conventional decision-boundary-consistent techniques for dimensions greater than three; (3) preserves the decision boundary of the region of interest; and (4) allows for further reduction of the training set in the cases where an admissible decision boundary change (via a user-specified tolerance) is allowed.

In one embodiment of the present invention, the use of this technique results in earlier detection of component degradation and better avoidance of system failures, which is crucial for achieving higher availability of computer systems.

Training Set Reduction

In a two-group pattern classification application, C1, C2, and D={C1, C2} denote the collection of data patterns in $R^d$, where $d \geq 1$, that belong to class (group) 1, the collection of data patterns in $R^d$ that belong to class (group) 2, and the collection of all data patterns in the training data set, respectively. A non-parametric pattern classifier uses training set D, which comprises n data patterns of both classes, to assign new unknown-class patterns into one of the two classes based on the decision rule that the pattern classifier implements.

For example, a two-group pattern classification problem can involve mining a large database of telemetry signals from a population of servers that either suffered a particular failure mechanism (class 1), or did not suffer the particular failure mechanism (class 2). If a pattern recognition technique can successfully classify the data into class 1 versus class 2 (i.e. the "failed" versus "not failed" categories), then the trained classification mechanism can be used to processes telemetry data from the field. This process flags servers that are considered at elevated risk of failure.

All known types of non-parametric classifiers require $O(n)$ to $O(n^2)$ operations. Such a computation complexity limits their usage for applications involving online diagnostics and for applications involving offline mining of large databases. Therefore, the goal of a training set reduction technique is to reduce the training data set by deleting patterns that are not required for the decision-making process. The pruning of data patterns is ideally done judiciously so that the reduced training set preserves exactly or insignificantly changes the original decision boundary of the classifier.

Figure 1:
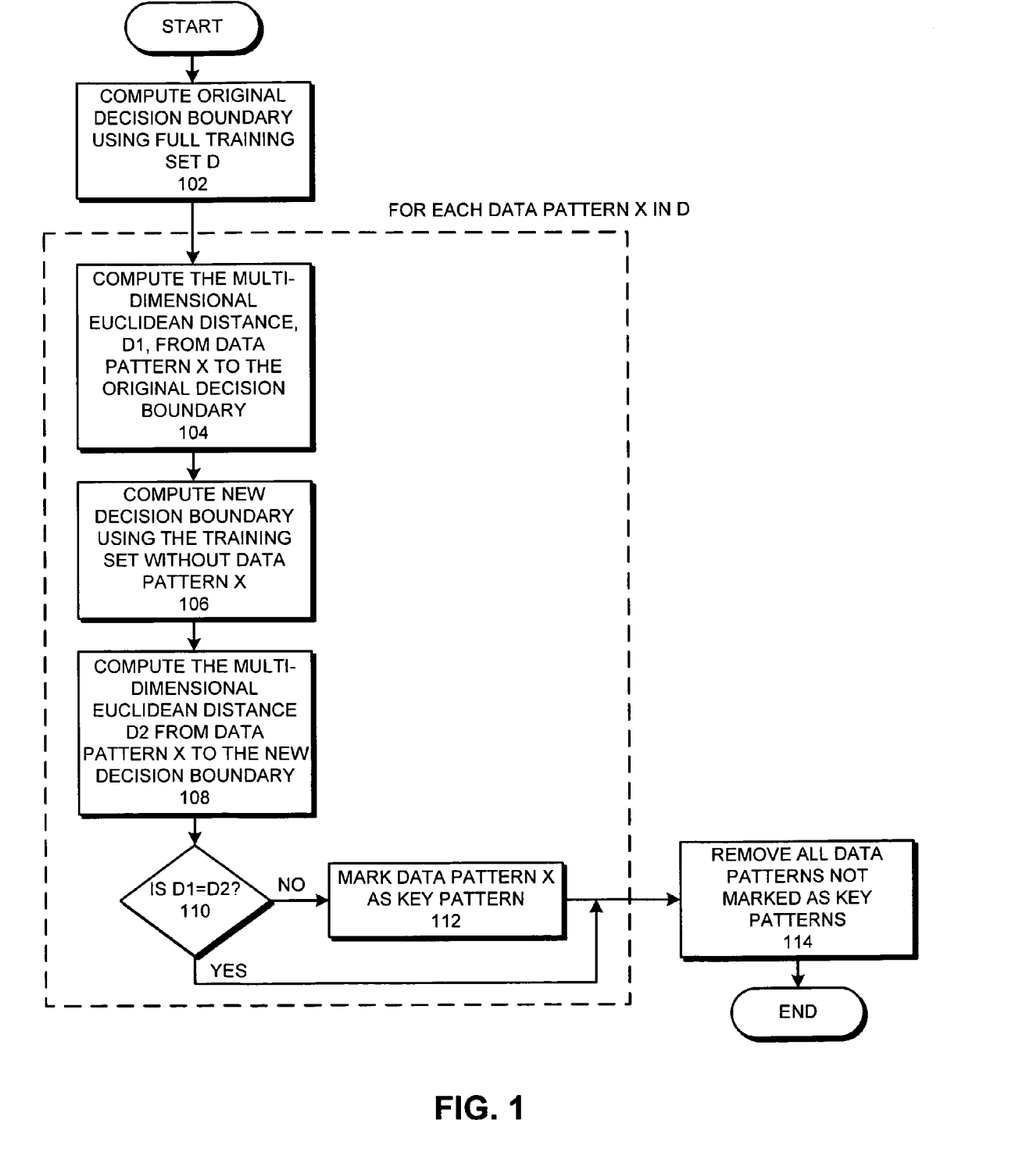
FIG. 1 presents a flow chart illustrating the process of reducing the size of a training set in accordance with an embodiment of the present invention.

The Key-Patterns-Extraction technique exploits an R-function-based representation of the classifier's decision boundary as described below. FIG. 1 presents a flow chart illustrating the process of reducing the size of a training set in accordance with an embodiment of the present invention. The process begins when the system computes the original decision boundary using the full training set D (step 102). For each data pattern X in training set D, the system: (1) computes the Euclidian distance, D1, to the original decision boundary (step 104); (2) computes a new decision boundary using the training set without data pattern X, represented as D\X (step 106); (3) computes the Euclidian distance, D2, to the new decision boundary (step 108); and (4) if D1≠D2, the system marks data pattern X as a "key pattern" (step 110 and 112). After iterating through all data patterns, the system removes all data patterns not marked as key patterns (step 114). Note that this technique requires $O(dn^3)$ operations and exactly preserves the original decision boundary of the classifier in the region of interest.

In the cases where an allowable level of decision-boundary change is specified, the Key-Patterns-Extraction technique reduces the size of the training set even further.

Figure 2:
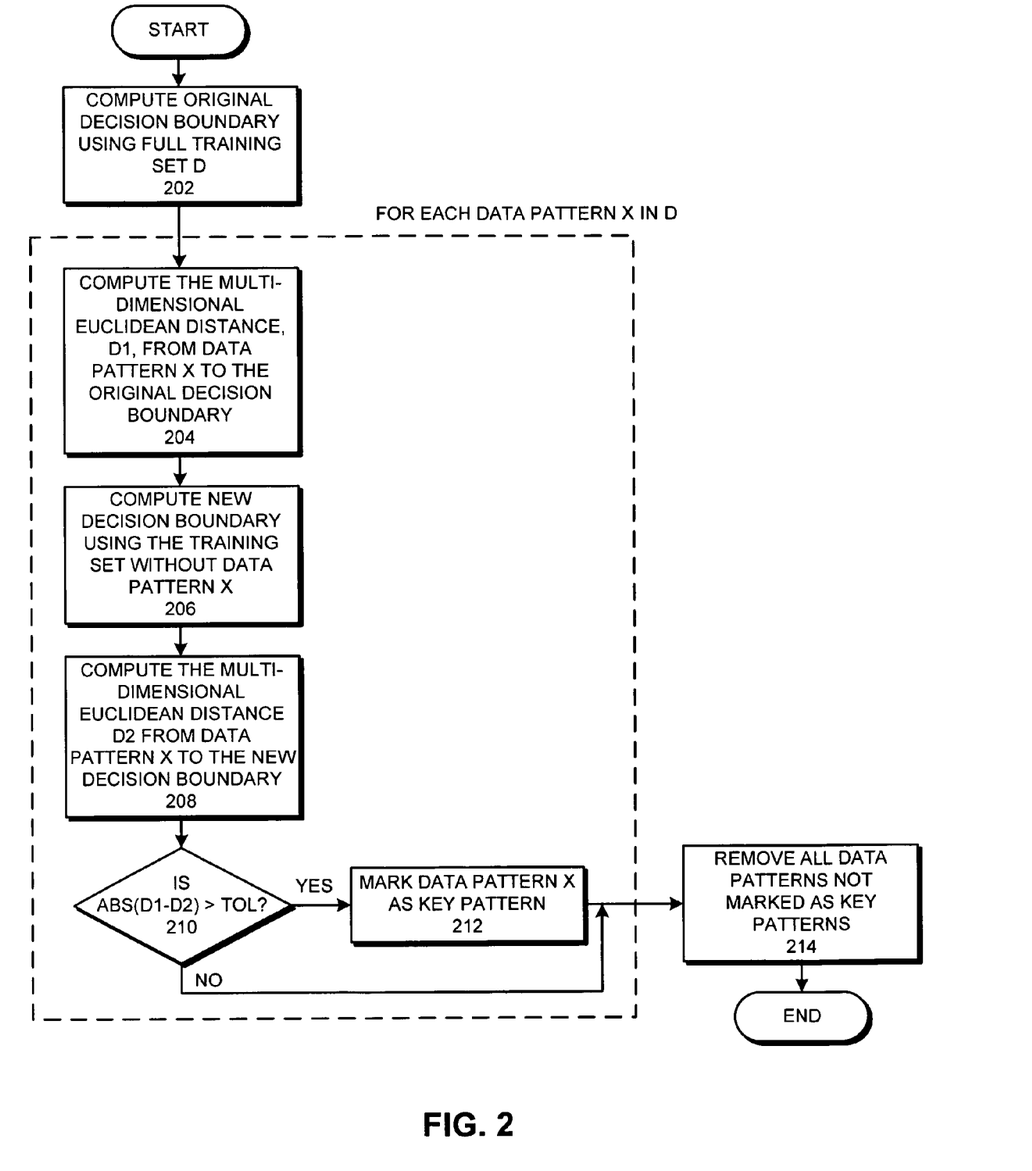
FIG. 2 presents a flow chart illustrating the process of further reducing the size of a training set in accordance with an embodiment of the present invention.

FIG. 2 presents a flow chart illustrating the process of further reducing the size of a training set in accordance with an embodiment of the present invention. The process begins when the system computes the original decision boundary using the full training set D (step 202). For each data pattern X in training set D, the system: (1) computes the Euclidian distance, D1, to the original decision boundary (step 204); (2) computes a new decision boundary using the training set without data pattern X, represented as D\X (step 206); (3) computes the Euclidian distance, D2, to the new decision boundary (step 208); and (4) if abs(D1−D2)>tol, the system marks data pattern X as a "key pattern" (step 210 and 212). After iterating through all data patterns, the system removes all data patterns not marked as key patterns (step 214).

In this embodiment, the reduced training set changes the decision boundary locally by no more than the user-specified tolerance value, tol. In addition, for small values of the tolerance, the new decision boundary typically differs from the original decision boundary in the region outside of the convex hull of the training set, which is usually not of interest for classification-type pattern recognition problems (the data outside of the convex hull of the training set has minimal, if any, influence on the decision boundary).

In the following sections of this disclosure, we provide a more-detailed description of the general pattern classification operations performed by one embodiment of the present invention.

Pattern Recognition and Pattern Classification

Pattern recognition is a commonly performed task in engineering systems. The problem of pattern recognition is to assign (or classify) objects into categories. Typically, similar objects fall into the same category. However, it is not uncommon that objects in the same category may vary widely, while objects in different categories may be very similar. The problem of two-class pattern recognition classifies input patterns into only two categories (or classes). A typical example of a two-class pattern recognition problem is to distinguish between good and faulty components for fault-detection and isolation (FDI) applications. Another example is to distinguish between normal and runaway states of software processes using various software metrics in software aging and rejuvenation.

Let $X=\{X_1, X_2, \ldots, X_d\}$ be the set of features or parameters describing objects as d-dimensional vectors $x=[x_1, x_2, \ldots, x_d]^T$ in $R^d$, and let $D=\{x_1, x_2, \ldots, x_n\}$, where $x_j=[x_{1j}, x_{2j}, \ldots, x_{dj}]^T$ in $R^d$, be the design data set of input data points. Each data point in the design data set has a class label associated with it, for example, $x_j^{(C)}=[x_{1j}^{(C)}, x_{2j}^{(C)}, \ldots, x_{dj}^{(C)}]^T$, where $C \in \{1, 2\}$ is a class label for two classes. When class labels are unknown in the design set, the problem becomes an unsupervised pattern recognition problem and is dealt with by using clustering techniques.

In one embodiment of the present invention, the class labels are known for the design data set. In this embodiment, a decision function based on the design (training) data set is found which distinguishes representatives of one class from the representatives of the other class. The computed decision function is then used to classify previously unseen patterns. Note that the process of automated labeling of previously unseen patterns is referred to as pattern classification.

R-Function-Based Representation of Geometrical Objects

A real-valued function $f(x_1, x_2, \ldots, x_d)$ whose sign is completely determined by the signs of its arguments $x_i$ (i.e. the function changes its sign only when its arguments change their signs) is called an R-function. The sign of an R-function can be considered as a logical property. Negative values can be interpreted as a logical false, and positive values can be interpreted as a logical true. R-functions can be evaluated, can be differentiated, and have other useful properties. One application of R-functions is to represent geometrical objects in Euclidean space $R^n$, which is a generalization of 2-dimensional and 3-dimensional spaces for a coordinate system with n dimensions. R-functions can represent any geometrical object S in $R^d$ by equation $f(x)=0$ and in equality $f(x) \geq 0$, wherein $f(x)$ is a specified number-of-times continuously differentiable function that satisfies $f(x)=0$ and $f(x) \geq 0$ only for the points belonging to S. Note that $f(x)$ is written as a single analytical expression. The set of points in Euclidean space $R^d$ in which function $f(x)$, where $x=(x_1, x_2, \ldots, x_d)$, equals zero is called the boundary of the geometrical object described by equation $f(x)=0$. The set of all points in $R^d$ in which $f(x)$ is non-negative is called the region described by inequality $f(x) \geq 0$.

Separating Primitives and Point-to-Point Separating Boundary $\rho(x; u, v)$ is a separating primitive, which is a real-valued function of one vector-variable $x \in R^d$, and two vector-parameters $u \in R^d$ and $v \in R^d$. All x, u, and v are points in d-dimensional space $R^d$. A separating primitive divides the d-dimensional space $R^d$ into two subspaces or regions, one containing point u and the other containing point v. Thus, the separating primitive, defined on two points u and v, separates these two points. Generally, a separating primitive can be regarded as a decision boundary for a pair of points from two classes. Note that $\rho(x; u, v)>0$ for all x in the subspace containing u, and $\rho(x; u, v)<0$ for all x in the subspace containing v. Points x in which $\rho(x; u, v)=0$ define a point-to-point separating boundary that separates u and v.

Figure 3:
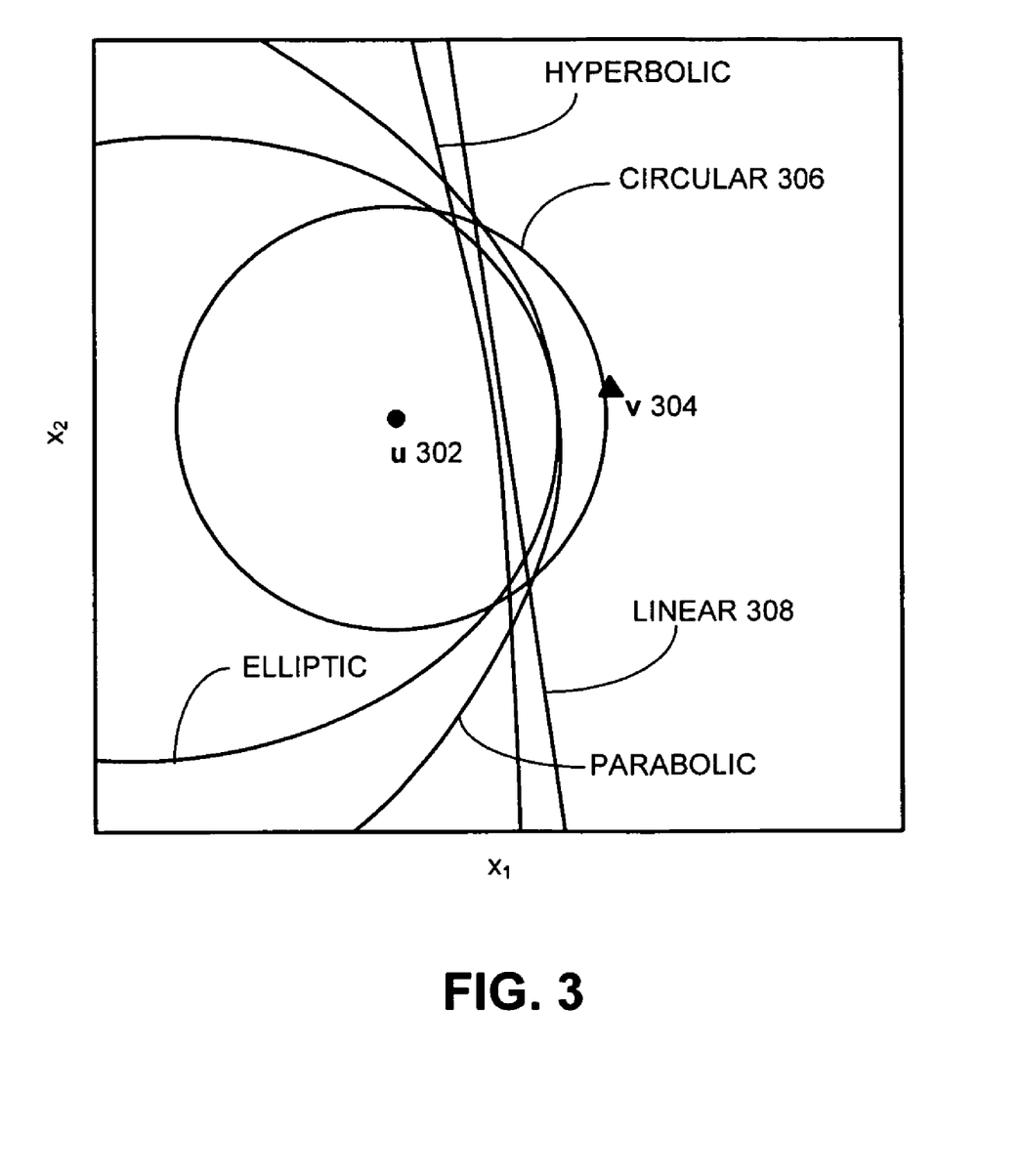
FIG. 3 illustrates some typically two-dimensional separating primitives in accordance with an embodiment of the present invention.

There are many choices for separating primitives. FIG. 3 illustrates some typically two-dimensional separating primitives in accordance with an embodiment of the present invention. In FIG. 3, the small filled circle 302 is denoted as point $u=[u_1, \ldots, u_d]^T$, which is a class-one data point, and the filled triangle 304 is denoted as point $v=[v_1, \ldots, v_d]^T$, which is a class-two data point. The equations defining these separating primitives for the general d-dimensional case are listed in Table 1. Note that an d-dimensional spherical primitive becomes a circle 306, and an d-dimensional linear primitive becomes a straight line 308 in the two-dimensional space as illustrated in FIG. 3. In Table 1, d(u, v) denotes the Euclidian distance between points u and v in the d-dimensional space $R^d$, wherein points u and v are separated by a multidimensional separating primitive given by the equation $\rho(x; u, v)=0$.

Point-to-Class Separating Boundary

Figure 4A:
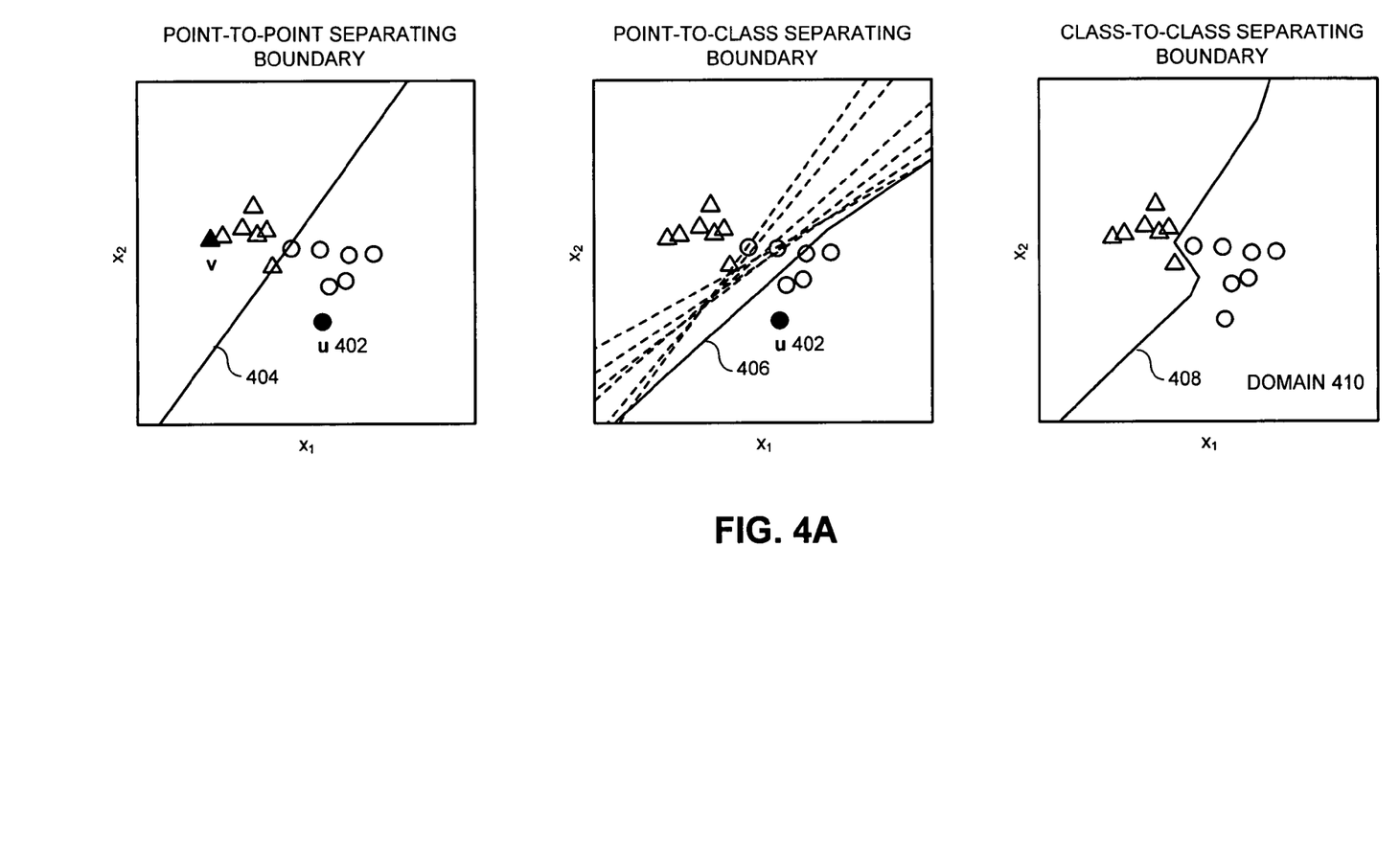
FIG. 4A illustrates the process of constructing a data classifier using a linear separating primitive in accordance with an embodiment of the present invention.
Figure 4B:
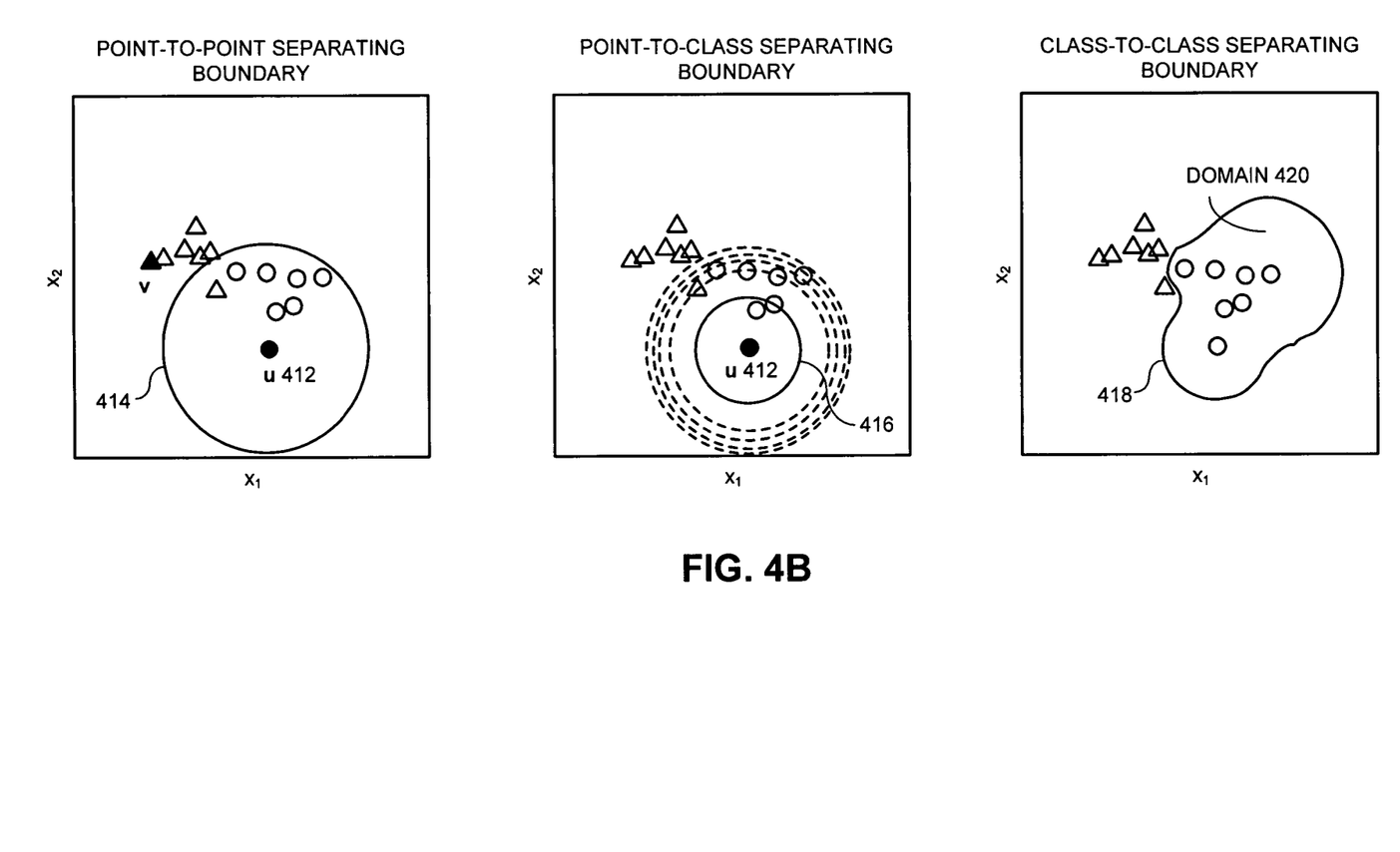
FIG. 4B illustrates the process of constructing a data classifier using a circular separating primitive in accordance with an embodiment of the present invention.

A point-to-class separating boundary separates a single point of class-one from all the class-two points in the training set D. FIG. 4A illustrates the process of constructing a data classifier using a linear separating primitive in accordance with an embodiment of the present invention. Similarly, FIG. 4B illustrates the process of constructing a data classifier using a circular separating primitive in accordance with an embodiment of the present invention. Note that the class-one and class-two data points are represented by circles and triangles respectively.

Consider one of the class-one data points which is denoted as u. This point is shown as a filled circle 402 in the middle plot in FIG. 4A in the case of the linear separating primitive, and a filled circle 412 in the middle plot in FIG. 4B in the case of the circular separating primitive. Taking each of the class-two data points in the set $x_j^{(2)}, j=1 \ldots k^{(2)}$, shown as triangles in FIGS. 4A and 4B, and constructing a separating primitive $\rho(\bullet; u, x_j^{(2)})$ for each pair of $\{u, x_j^{(2)}\}$, we obtain $k^{(2)}$ point-to-point separating boundaries (shown as dashed lines in the middle plots in FIGS. 4A and 4B), wherein each of the point-to-point separating boundaries separates u from the corresponding $x_j^{(2)}$. Note that a point-to-point separating boundary defined by separating primitive $\rho(\bullet; u, x_j^{(2)})$ separates u from $x_j^{(2)}$ but may or may not separate u from some other class-two data points (i.e., $x_i^{(2)}$, where $i \neq j$). For example, a linear separating boundary 404 and a circular separating boundary 414 are shown as a solid line and a solid circle in the leftmost plots in FIGS. 4A and 4B, respectively. Note that separating boundaries 404 and 414 separate class-one data point u from class-two data point v, respectively.

All $k^{(2)}$ point-to-point separating boundaries are then combined in a manner that the resulting separating boundary separates u from all the class-two points in the training set D, which is referred to as a point-to-class separating boundary. Such a point-to-class separating boundary is realized as the intersection or conjunction of the areas formed by all $k^{(2)}$ equations $\rho(\bullet; u, x_{j(2)})>0$, i.e., all the areas that include u. This point-to-class separating boundary is shown in the middle plot in FIG. 4A as solid curved line 406 and in the middle plot in FIG. 4B as solid circle 416. In one embodiment of the present invention, the intersection of the areas is obtained by using the R-function. Note that the R-function operation on these areas mimics the logical conjunction of sets, which is be referred to as R-conjunction for simplicity. Mathematically, the point-to-class separating boundary is expressed as:

$$b^{(1)}(\bullet; u) = \Lambda_j \rho(\bullet; u, x_j^{(2)}), j=1 \ldots k^{(2)}, \quad \text{(Eq. 1)}$$

wherein the symbol $\Lambda$ denotes the R-conjunction operation.

Class-to-Class Separating Boundary (Classifier)

By constructing point-to-class separating boundaries for each class-one point in training set D, $x_i^{(1)}$, $i=1 \ldots l^{(1)}$, and combining all $l^{(1)}$ separating boundaries, a class-to-class separating boundary is generated which separates all class-one data points from all class-two data points in the design data set $D=\{x_i^{(1)}, x_j^{(2)}\}$. This class-to-class separating boundary is shown as solid curved lines 408 and 418 in the rightmost plots in FIGS. 4A and 4B, respectively. Note that class-to-class separating boundaries 408 and 418 divide each of the 2-dimensional spaces into two domains, wherein domains 410 and 420 contains exclusively class-one data points. We refer to these domains associated with the class-one data point as R-clouds for simplicity.

In one embodiment of the present invention, an R-cloud that represents a multi-dimensional classification domain of the class-one data point is obtained using the R-function. Note that each of the point-to-class separating boundaries $b^{(1)}(\bullet; x_i^{(1)})$, $i=1 \ldots l^{(1)}$ divides a multi-dimensional space into two subspaces, wherein one of the subspaces is a class-one subspace. The R-function performs a logical disjunction operation on all the class-one subspaces which are defined by an inequality expression $b^{(1)}(\bullet; x_i^{(1)}) \geqq 0$, $i=1 \ldots l^{(1)}$. The R-function operation on these subspaces is referred to as an R-conjunction for simplicity.

Note that there are two symmetric class-to-class separating boundary construction processes, one for class-one data points and one for class-two data points. Mathematically, the two processes using R-function can be expressed as:

$$R^{(1)}(\bullet) = \vee_i b^{(1)}(\bullet; x_i^{(1)}) = \vee_i \Lambda_j \rho(\bullet; i_i^{(1)}, x_j^{(2)}), \text{ and} \quad \text{(Eq. 2a)}$$

$$R^{(2)}(\bullet) = \vee_j b^{(2)}(\bullet; x_j^{(2)}) = \vee_j \Lambda_i \rho(\bullet; x_j^{(2)}, x_i^{(1)}), \quad \text{(Eq. 2b)}$$

for $i=1 \ldots l^{(1)}$, $j=1 \ldots k^{(2)}$, wherein the symbol $\vee$ denotes the R-disjunction operation, and the symbol $\Lambda$ denotes the R-conjunction operation. The main feature of the resultant analytical representations $R_{(1)}(\bullet)$ and $R^{(2)}(\bullet)$ is that $R^{(1)}(x_i^{(1)})>0$ for all points belonging to class-one in the design data set, and $R^{(2)}(x_j^{(2)})>0$ for all the points belonging to class-two in the design set. $R^{(1)}(\bullet)>0$ and $R^{(2)}(\bullet)>0$ then define two spaces in which data points contain within the spaces will be classified as class-one and class-two data points, respectively.

Process of Constructing the Classifier

Figure 5A:
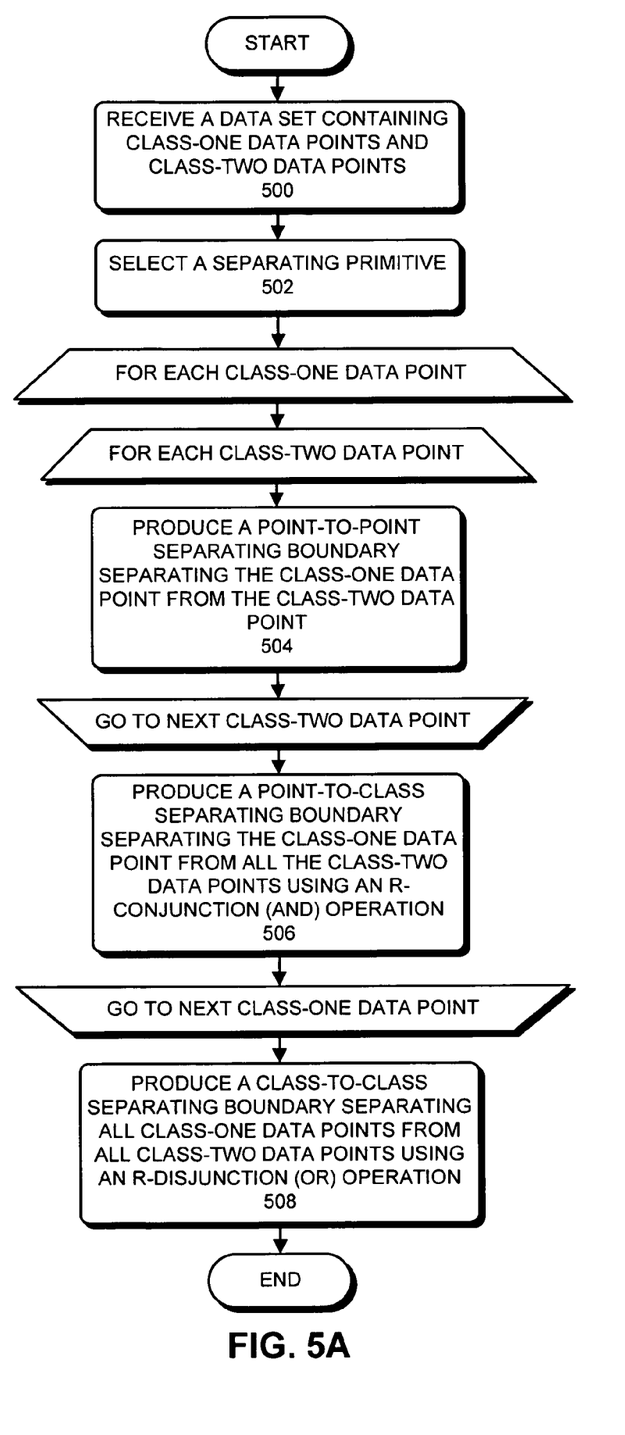
FIG. 5A presents a flowchart illustrating the process of constructing a classifier that distinguishes between the class-one and class-two data points in accordance with an embodiment of the present invention.

FIG. 5A presents a flowchart illustrating the process of constructing a classifier that distinguishes between the class-one and class-two data points in accordance with an embodiment of the present invention.

The process begins with receiving an input data set, which includes class-one data points and class-two data points (step 500). In one embodiment of the present invention, data points in the input data set are registered and normalized prior to the reception of the data set. Also note that each data points in the input data set have been labeled as either class-one or class-two.

The process then selects one of the commonly used separating primitives, for example, from the list in Table 1 (step 502).

Next, for a class-one data point in the data set, the process recursively chooses each of the class-two data points, and uses the selected separating primitive to produce a set of point-to-point separating boundaries, such that each of the point-to-point separating boundary separates the class-one data point from a different class-two data point (step 504).

The process next combines the set of point-to-point separating boundaries from step 504 to produce a point-to-class separating boundary that separates the class-one data point from all of the class-two data points in the data set (step 506).

Figure 5B:
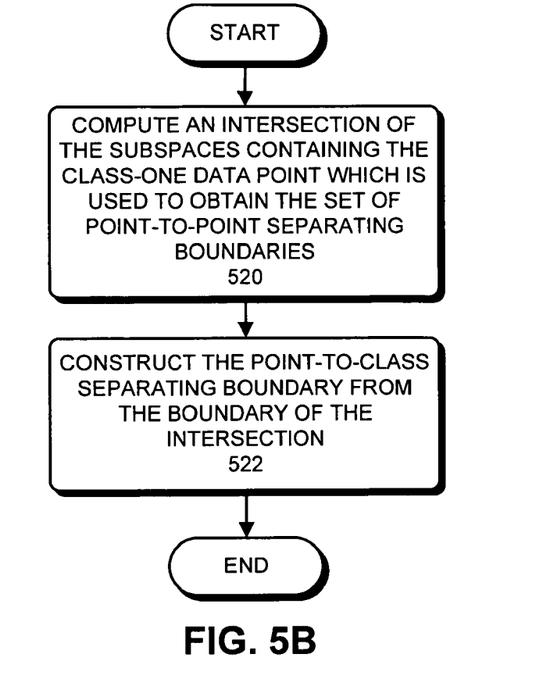
FIG. 5B presents a flowchart illustrating the process of producing a point-to-class separating boundary in accordance with an embodiment of the present invention.

FIG. 5B presents a flowchart illustrating the process of producing a point-to-class separating boundary in accordance with an embodiment of the present invention. Specifically, the process first computes the intersection of a set of subspaces defined by the set of point-to-point separating boundaries, wherein each subspace in the set of subspaces contains the class-one data point (step 520). Mathematically, each subspace in the set of subspaces satisfied the inequality $\rho(x; u, v)>0$ for all point x in the subspace containing the class-one data point u, wherein $\rho(x; u, v)$ is the selected separating primitive, and v is a class-two data point.

Note that the process computes the intersection of the subspaces using an R-function, wherein the R-function performs a logical conjunction (AND) operation on the set of point-to-point separating boundaries to produce the point-to-class separating boundary. Next, the process constructs the point-to-class separating boundary from the boundary of the intersection of the set of subspaces (step 522).

Referring back to FIG. 5A, the process repeats steps 504 and 506 for all class-one data points and produces a set of point-to-class separating boundaries for each of the class-one data points.

Finally, the process combines the set of point-to-class separating boundaries to produce a class-to-class separating boundary, i.e., the classifier that separates all of the class-one data points from all of the class-two data points in the data set (step 508).

Figure 5C:
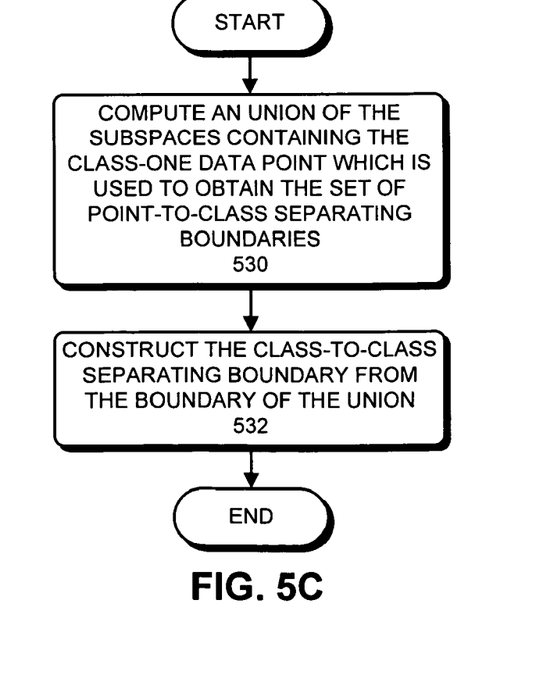
FIG. 5C presents a flowchart illustrating the process of producing a class-to-class separating boundary in accordance with an embodiment of the present invention.

FIG. 5C presents a flowchart illustrating the process of producing a class-to-class separating boundary in accordance with an embodiment of the present invention. Specifically, the process first computes the union of a set of subspaces defined by the point-to-class separating boundaries, wherein each subspace in the set of subspaces contains a selected class-one data point (step 530).

Note that the process computes the union of the set of subspaces using an R-function, wherein the R-function performs a logical disjunction (OR) operation on the set of point-to-class separating boundaries to produce the class-to-class separating boundary. Next, the process constructs the class-to-class separating boundary from the boundary of the union of the set of subspaces (step 532).

Mathematically, the class-to-class separating boundary is defined in an d-dimensional space by an equation $R(x)=0$, wherein x is an d-dimensional vector-variable, and $R(x)$ is defined in [Eq. 1]. Note that $R(x^{(1)})>0$ for all class-one data points $x^{(1)}$ in the data set, while $R(x^{(2)})<0$ for all class-two data points $x^{(2)}$ in the data set.

Using the Classifier for Pattern Classification

In one embodiment of the present invention, the data points used for constructing the class-to-class classifier can be considered as a group of training patterns for a pattern classification system. When the class-to-class classifier is constructed from these train patterns, it can be used to classify new, previously unseen patterns. As these new, previously unseen patterns represented by vector-variable $x \in R^d$ become available, the following procedure is performed to assign proper class labels to these new patterns. Specifically, if a new pattern x is inside R-cloud $R^{(1)}$ (i.e. $R^{(1)}(x)>0$) and is outside of R-cloud $R^{(2)}$ (i.e., $R^{(2)}(x)<0$), then x is labeled as a class-one data pattern (i.e. x belongs to class-one). If x is outside of $R^{(1)}$ (i.e. $R^{(1)}(x)<0$), and inside of $R^{(2)}$ (i.e., $R^{(2)}(x)>0$), then x is labeled as a class-two data pattern.

Note that there are two more possibilities. One is a situation where x is inside both R-clouds ($R^{(1)}(x)>0$ and $R^{(2)}(x)>0$), which can occur only when there is an overlap between the two R-clouds $R^{(1)}$ and $R^{(2)}$. In this case, no label can be assigned to new pattern x and it should be rejected (i.e., weak rejection). Such situations occur when the underlying class-generating distributions naturally overlap. For applications which rejection is undesirable, a classification decision can be made by computing the distances from data point x to the boundaries of each of the two overlapping R-clouds, and assigning the label of the R-cloud for which the computed distance is larger. The rationale behind this rule for overlapping R-clouds is that x is deeper inside the R-cloud in which the distance from x to the boundary of that R-cloud is the larger one.

The other possibility is a situation where a new data pattern x is outside of both R-clouds ($R^{(1)}(x)<0$ and $R^{(2)}(x)<0$), i.e. x does not belong to either of the two classes. In such a case, the data pattern is also rejected because the pattern is not close to either class (i.e., strong rejection). All four pattern classification situations described above are summarized in Table 2.

TABLE 1

Separating Primitives

| | |
|---|---|
| Linear | $\rho_l(x; u, v, \alpha) = n^T ((v + u)/2 - \alpha n - x), n = (u - v)/\|u - v\|$ |
| Spherical | $\rho_s(x; u, v, \alpha) = \alpha d(v, u) - d(u, x)$ |
| Parabolic | $\rho_p(x; u, v, \alpha) = d^{-1}(u, v)(v - u)^T(\alpha u + (1 - \alpha)v - x) - d(x, u)$ |
| Hyperbolic | $\rho_h(x; u, v, \alpha) = d(x, u) - d(x, v) - \alpha d(u, v)$ |
| Elliptic | $\rho_e(x; u, v, (\alpha, \beta)) = (1 - \alpha)d(u, v) + d(u, u - \beta(v - u)) - d(x, u) - d(x, u - \beta(v - u))$ |

TABLE 2

The R-Cloud Classifier Decision Making Options

| $R_1(x)$ | $R_2(x)$ | Decision |
|---|---|---|
| >0 | ≦0 | Class 1 |
| ≦0 | >0 | Class 2 |
| ≧0 | ≧0 | Weak rejection |
| ≦0 | ≦0 | Strong rejection |

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for classifying a data pattern into one or more groups, comprising:
   computing a decision boundary which separates a first group of data patterns in a training data set from a second group of data patterns in the training data set;
   for each data pattern in the training data set,
      determining if removing the data pattern from the training data set substantially affects the resulting decision boundary; and
      if so, marking the data pattern as a key pattern;
   removing all data patterns that are not marked as key patterns to produce a reduced training data set which represents the decision boundary;
   classifying a previously unseen data pattern into one or more groups by applying the decision boundary to the previously unseen data pattern; and
   producing a result which indicates the one or more groups of the previously unseen data pattern.

2. The method of claim 1, wherein determining if removing the data pattern substantially affects the decision boundary involves:
   computing a first Euclidian distance from the data pattern to the decision boundary;

removing the data pattern from the training data set;

computing a new decision boundary from the data set without the data pattern;

computing a second Euclidian distance from the data pattern to the new decision boundary; and if the absolute value of the difference between the second Euclidian distance and the first Euclidian distance is greater than a pre-specified tolerance, marking the data pattern as a key pattern.

3. The method of claim 2, wherein the pre-specified tolerance is zero, so that if the second Euclidian distance is not equal to the first Euclidian distance, the data pattern is marked as a key pattern.

4. The method of claim 2, wherein computing the new decision boundary involves:

for each data pattern in the first group of data patterns,
selecting a data pattern from the first group of data patterns;
for each data pattern in the second group of data patterns, generating a separating boundary that separates the data pattern in the first group of data patterns from the data pattern in the second group of data patterns; and
generating a separating bundle which separates the data pattern in the first group of data patterns from all data patterns in the second group of data patterns; and generating the new decision boundary which separates all data patterns in the first group of data patterns from all data patterns in the second group of data patterns using the separating bundles.

5. The method of claim 1, further comprising using the reduced data set to classify a previously unseen pattern by:

determining the region of the input space in which the previously unseen pattern is located;

if the previously unseen pattern is located within the region which corresponds to the first group of data patterns, classifying the previously unseen data pattern as belonging to the first group of data patterns; and otherwise, classifying the previously unseen data pattern as belonging to the second group of data patterns.

6. The method of claim 1, further comprising using R-functions to compute a decision boundary which is used to classify data patterns, wherein an R-function is a function whose sign is determined by the signs of its arguments.

7. A computer-readable storage medium storing instructions that when executed by a computer cause the computer to perform a method for classifying a data pattern into one or more groups, the method comprising:

computing a decision boundary which separates a first group of data patterns in a training data set from a second group of data patterns in the training data set;

for each data pattern in the training data set,
determining if removing the data pattern from the training data set substantially affects the resulting decision boundary; and
if so, marking the data pattern as a key pattern;

removing all data patterns that are not marked as key patterns to produce a reduced training data set which represents the decision boundary;

classifying a previously unseen data pattern into one or more groups by applying the decision boundary to the previously unseen data pattern; and producing a result which indicates the one or more groups of the previously unseen data pattern.

8. The computer-readable storage medium of claim 7, wherein determining if removing the data pattern substantially affects the decision boundary involves:

computing a first Euclidian distance from the data pattern to the decision boundary;

removing the data pattern from the training data set;

computing a new decision boundary from the data set without the data pattern;

computing a second Euclidian distance from the data pattern to the new decision boundary; and if the absolute value of the difference between the second Euclidian distance and the first Euclidian distance is greater than a pre-specified tolerance, marking the data pattern as a key pattern.

9. The computer-readable storage medium of claim 8, wherein the pre-specified tolerance is zero, so that if the second Euclidian distance is not equal to the first Euclidian distance, the data pattern is marked as a key pattern.

10. The computer-readable storage medium of claim 8, wherein computing the new decision boundary involves:

for each data pattern in the first group of data patterns,
selecting a data pattern from the first group of data patterns;
for each data pattern in the second group of data patterns, generating a separating boundary that separates the data pattern in the first group of data patterns from the data pattern in the second group of data patterns; and
generating a separating bundle which separates the data pattern in the first group of data patterns from all data patterns in the second group of data patterns; and generating the new decision boundary which separates all data patterns in the first group of data patterns from all data patterns in the second group of data patterns using the separating bundles.

11. The computer-readable storage medium of claim 7, the method further comprising using the reduced data set to classify a previously unseen pattern by:

determining the region of the input space in which the previously unseen pattern is located;

if the previously unseen pattern is located within the region which corresponds to the first group of data patterns, classifying the previously unseen data pattern as belonging to the first group of data patterns; and otherwise, classifying the previously unseen data pattern as belonging to the second group of data patterns.

12. The computer-readable storage medium of claim 7, the method further comprising using R-functions to compute a decision boundary which is used to classify data patterns, wherein an R-function is a function whose sign is determined by the signs of its arguments.

13. An apparatus that classifies a data pattern into one or more groups comprising:

a computing mechanism configured to compute a decision boundary which separates a first group of data patterns in a training data set from a second group of data patterns in the training data set;

a pattern-reduction mechanism configured to:
for each data pattern in the training data set, to
determine if removing the data pattern from the training data set substantially affects the resulting decision boundary; and
if so, to mark the data pattern as a key pattern; and to
remove all data patterns that are not marked as key patterns to produce a reduced training data set which represents the decision boundary;

a classification mechanism configured to classify a previously unseen data pattern into one or more groups by applying the decision boundary to the previously unseen data pattern; and a result-producing mechanism configured to produce a result which indicates the one or more groups of the previously unseen data pattern.

14. The apparatus of claim 13, wherein while determining if removing the data pattern substantially affects the decision boundary, the pattern-reduction mechanism is configured to:

compute a first Euclidian distance from the data pattern to the decision boundary;

remove the data pattern from the training data set;

compute a new decision boundary from the data set without the data pattern;

compute a second Euclidian distance from the data pattern to the new decision boundary; and if the absolute value of the difference between the second Euclidian distance and the first Euclidian distance is greater than a pre-specified tolerance, to mark the data pattern as a key pattern.

15. The apparatus of claim 14, wherein the pre-specified tolerance is zero, so that if the second Euclidian distance is not equal to the first Euclidian distance, the data pattern is marked as a key pattern.

16. The apparatus of claim 14, wherein while computing the new decision boundary, the pattern-reduction mechanism is configured to:

for each data pattern in the first group of data patterns, to
 select a data pattern from the first group of data patterns;
  for each data pattern in the second group of data patterns, to generate a separating boundary that separates the data pattern in the first group of data patterns from the data pattern in the second group of data patterns; and
to
generate a separating bundle which separates the data pattern in the first group of data patterns from all data patterns in the second group of data patterns; and to generate the new decision boundary which separates all data patterns in the first group of data patterns from all data patterns in the second group of data patterns using the separating bundles.

17. The apparatus of claim 13, further comprising a pattern-classifying mechanism configured to use the reduced data set to classify a previously unseen pattern.

18. The apparatus of claim 17, wherein while using the reduced data set to classify a previously unseen pattern, the pattern-classification mechanism is configured to:

determine the region of the input space in which the previously unseen pattern is located;

if the previously unseen pattern is located within the region which corresponds to the first group of data patterns, classify the previously unseen data pattern as belonging to the first group of data patterns; and otherwise, to classify the previously unseen data pattern as belonging to the second group of data patterns.

19. The apparatus of claim 13, wherein the computing mechanism is configured to use R-functions to compute a decision boundary which is used to classify data patterns, wherein an R-function is a function whose sign is determined by the signs of its arguments.

\* \* \* \* \*